UNITED STATES PATENT OFFICE.

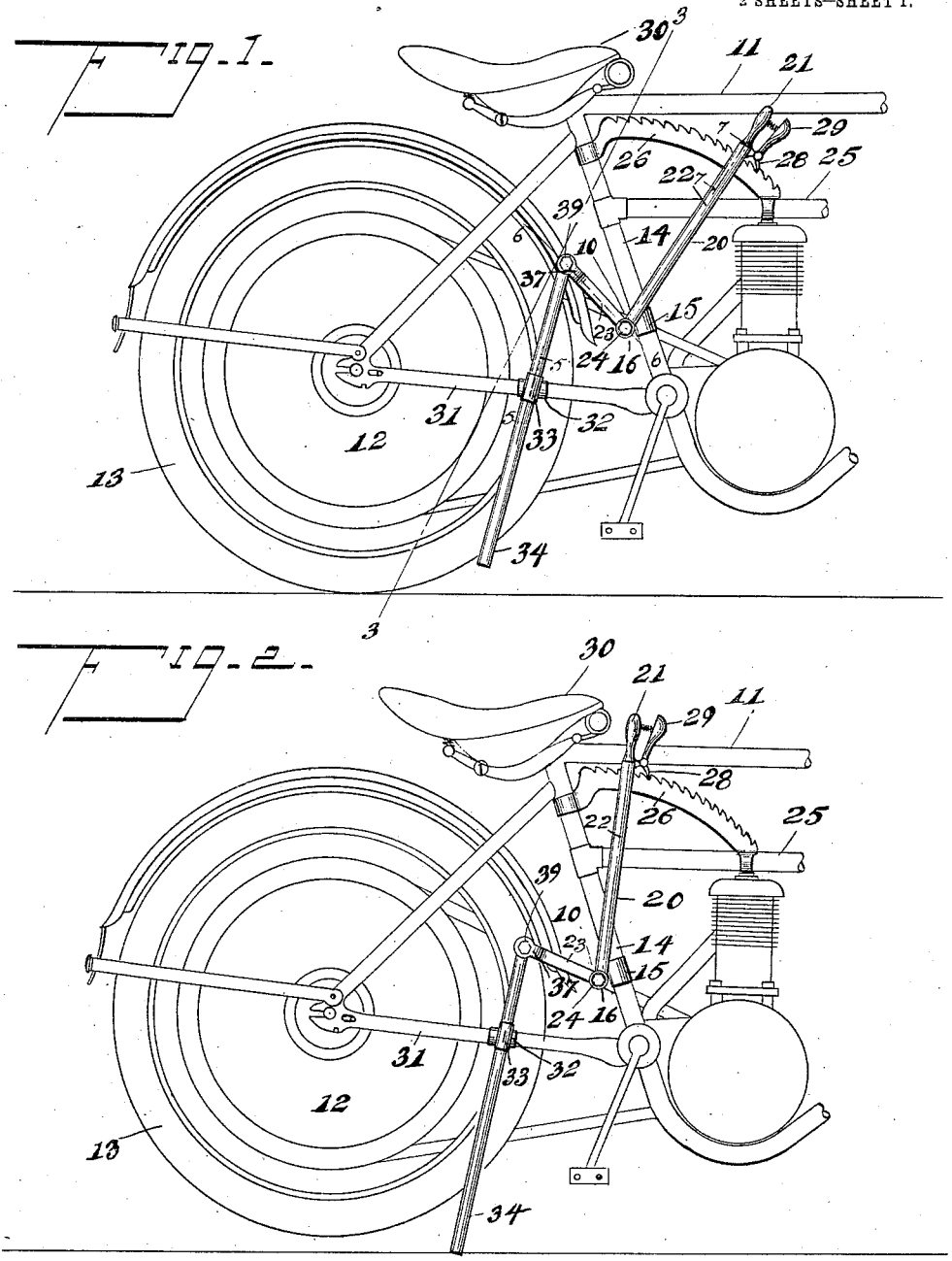

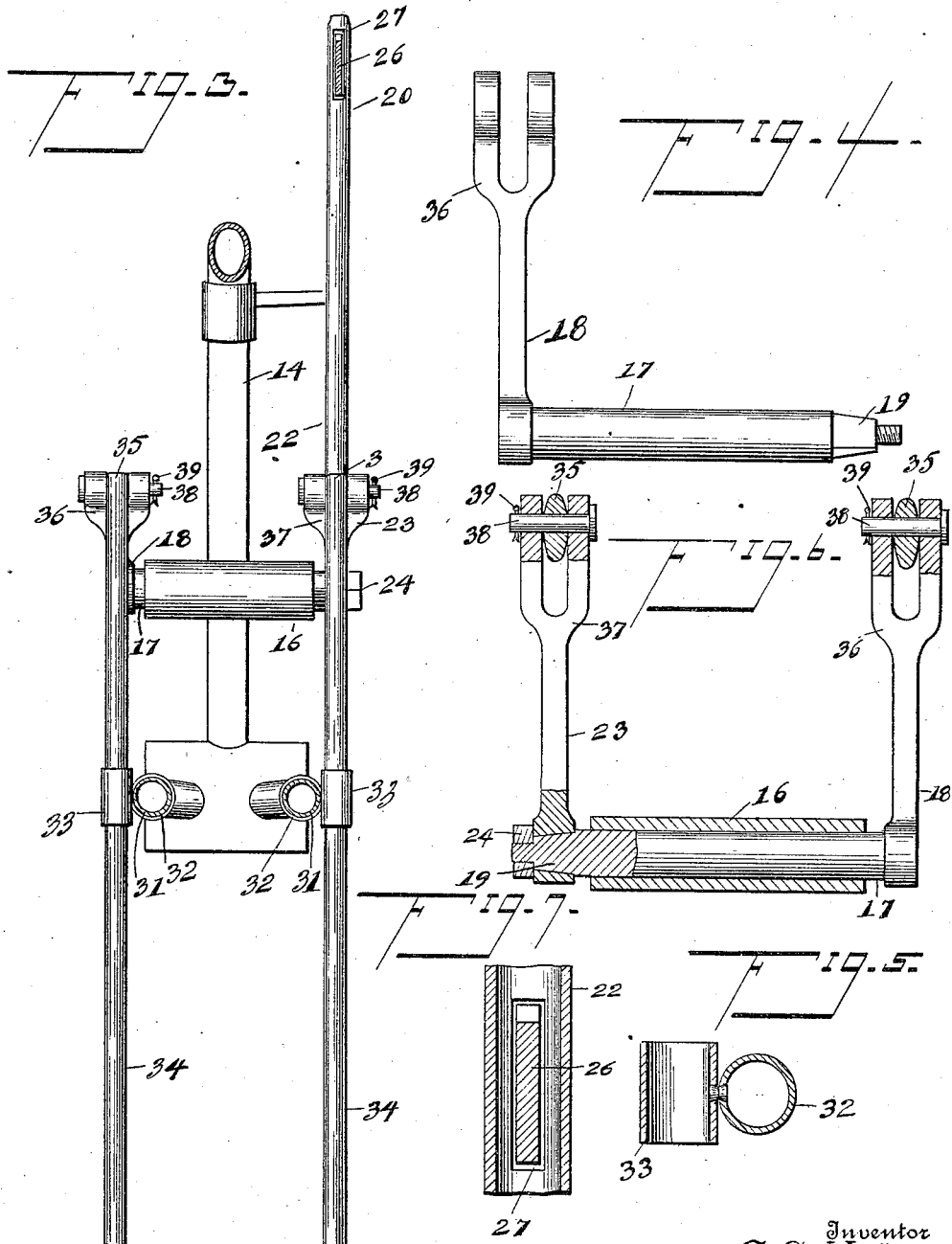

GROVER C. HILL, OF OWENSBORO, KENTUCKY.

VEHICLE-SUPPORT.

1,054,545.  Specification of Letters Patent.  Patented Feb. 25, 1913.

Application filed July 5, 1912. Serial No. 707,785.

*To all whom it may concern:*

Be it known that I, GROVER C. HILL, a citizen of the United States, residing at Owensboro, in the county of Daviess and State of Kentucky, have invented new and useful Improvements in Vehicle-Supports, of which the following is a specification.

An object of the invention is to provide a device for supporting a vehicle to elevate the driving wheel thereof with respect to the ground.

The invention embodies, among other features, a device more particularly adapted for use in connection with vehicles such as motorcycles and in which a structure is employed whereby the rear driving wheel of the motorcycle, including the rear portions of the frame of the vehicle, can be elevated a distance from the ground and as conveniently returned to the ground.

In the further disclosure of the invention reference is to be had to the accompanying drawings, constituting a part of this specification, in which similar characters of reference designate corresponding parts in all the views, and in which:

Figure 1 is a fragmentary side elevation of a vehicle showing my device mounted thereon and in normal position; Fig. 2 is a similar view showing the device in supporting position; Fig. 3 is a sectional view taken substantially on line 3—3 in Fig. 1, and looking in the direction of the arrow; Fig. 4 is a detail view of the crank member, showing the same in elevation; Fig. 5 is a sectional view taken on the line 5—5 in Fig. 1; Fig. 6 is a longitudinal sectional view taken on line 6—6 in Fig. 1; and Fig. 7 is a sectional view taken on line 7—7 in Fig. 1.

Referring more particularly to the views, I employ a vehicle support 10 for connection with the frame 11 of a motorcycle 12, having a driving wheel 13 mounted thereon in the usual manner, the said driving wheel in this instance constituting the rear wheel of the motorcycle.

Secured to a bar 14 of the frame 11 is a collar 15 provided with a horizontally arranged sleeve 16 in which is journaled a shank 17 of a crank member 18, the free end of the shank 17 being adapted to project beyond an end of the sleeve 16 and having triangularly shaped burs 19 formed thereon to receive an operating lever 20, said operating lever consisting of a handle portion 21, a shank 22 and a crank portion 23, the mentioned crank portion being similar to that portion of the crank member 18 projected laterally from the shank 17, the mentioned operating lever 20 being connected to the shank 17 by passing the free end of the shank through an opening formed in the operating lever 20 at the point of intersection of the shank 22 thereof and the crank portion 23, triangularly shaped notches being provided in the operating lever to receive the burs 19, thus keying and rigidly securing the crank member 18 to the operating lever 20 so that when the handle portion 21 of the operating lever is grasped and operated, the crank member 18 will also be operated, a suitable lock nut 24 being mounted on the extremity of the shank 17 to rigidly secure the same to the operating lever 20.

The operating lever 20 extends upwardly adjacent a horizontal bar 25 of the frame 11 of the motorcycle 12 and secured to the said bar is a rack 26 adapted to pass through an opening 27, formed in the upper end of the handle portion 21 of the operating lever 20, a spring engaged pawl 28, provided with an integral handle 29, being mounted to swing on the handle portion 21 of the operating lever 20 with the free end of the pawl adapted to engage the teeth of the rack 26, for locking the operating lever 20 in a stationary position, the mentioned rack 26 and pawl 28 constituting an ordinary pawl and rachet mechanism, as will be readily understood, it being further seen that the upper end of the handle portion 21 is arranged immediately in front of the seat 30 provided for the reception of the operator of the motorcycle.

Secured to similar horizontal bars 31 of the frame 11 of the motorcycle 12 are collars 32 having sleeves 33 swivelly mounted thereon, this structure being shown in detail in Fig. 5. Arranged to slidably extend through the sleeves are supporting members 34, said supporting members being mounted on the frame of the motorcycle so that the wheel 13 will be interposed therebetween, the mentioned supporting members being further mounted so as not to interfere in any manner with the proper operation or rotation of the mentioned wheel. The upper ends of the supporting members are reduced to form apertured lugs 35, the lug 35 of one of the supporting members being received in a fork 36 formed on the crank member 18 and the lug 35 of the other supporting member being received in a fork 37 formed on the crank portion 23 of the operating lever 20, suitable pins 38 being passed transversely through the forks 36, 37 and the respective lugs 35 to journal the supporting members 34 on the crank portion 18 and the crank portion 23, suitable cotter pins 39 being preferably mounted to pass through the horizontally arranged pins 38 to secure the same in position and retain the supporting members 34 in pivotal connection with the crank member 18 and the crank portion 23.

It will now be seen by referring to Fig. 1 that when the operating lever 20 is in forward position the lower ends of the supporting members 34 will be spaced from the ground so that the wheel 13 will repose upon the ground. Now if it is desired to elevate the wheel 13 from the ground, the handle 29 of the pawl 28 is swung rearwardly to disengage the pawl from the teeth of the ratchet 26 and a rearward pull is then exerted on the operating lever 20, thus through the medium of the crank member 18 and the crank portion 23 of the operating lever 20, imparting a downward movement to the supporting members 34 to move the ends thereof into engagement with the ground, thus elevating the wheel 13 from the ground, it being readily seen that the rear portion of the frame of the vehicle will also be elevated when the operating lever 20 is swung into position to move the supporting members 34 into supporting position, as mentioned. It will now be seen that the rear part of the vehicle is conveniently elevated from the ground in order that the driving wheel 13 can be rotated while the vehicle remains in stationary position, the operating lever 20 being held in locked position by the pawl and ratchet mechanism described heretofore. Now if it is desired to return the wheel 13 to the ground, the pawl 28 is disengaged from the teeth of the rack 26 and the operating lever 20 is returned to forward position, thus moving the supporting members 34 upwardly and away from the ground and permitting the wheel 13 to reëngage the ground, the device being now in initial or non-supporting position.

From the foregoing description it will be seen that with a device of the character described the driving wheel of the motorcycle can be conveniently raised or lowered relatively to the ground and although I have described my device as employed in connection with a motorcycle it will be readily understood that the device can be also employed in connection with other vehicles or devices for the purpose of supporting the same.

Having thus described my invention, I claim:

1. In a vehicle support, the combination with a collar for connection with the frame of the vehicle, of a sleeve on the collar, a crank member journaled in the said sleeve, an operating lever provided with a crank portion and keyed to the said crank member, a plurality of collars secured to the frame of the vehicle, sleeves swivelly mounted on the said collars, and supporting members mounted to slidably extend through the said swivelly mounted sleeves and having pivotal connection with the said crank member and the crank portion of the said operating lever.

2. In a vehicle support, the combination with a collar for connection with the frame of the vehicle, of a sleeve on the collar, a crank member journaled in the said sleeve, an operating lever provided with a crank portion and keyed to the said crank member, a plurality of collars secured to the frame of the vehicle, sleeves swivelly mounted on the said collars, supporting members mounted to slidably extend through the said swivelly mounted sleeves and having pivotal connection with the said crank member and the crank portion of the said operating lever, a rack mounted on the frame of the vehicle, and a spring-actuated pawl mounted on the said operating lever and movable to engage the said rack to retain the said operating lever in locked position.

3. In a vehicle support, the combination with a crank member for pivotal connection with the frame of the vehicle, of an operating lever for rigid connection with the said crank member so that when the said operating lever is operated the said crank member will be operated, sleeves swivelly mounted on the frame of the vehicle, and supporting members mounted to slidably extend through the said sleeves and having pivotal connection with the said crank member and said operating lever.

4. In a vehicle support, the combination with a crank member for pivotal connection with the frame of the vehicle, of an operating lever for rigid connection with the said crank member so that when the said operating lever is operated the said crank member will be operated, sleeves swivelly mounted on the frame of the vehicle, supporting members mounted to slidably extend through the said sleeves and having pivotal connection with the said crank member and said operating lever, and means on the frame of the vehicle and adapted to be engaged by the operating lever to secure the same in locked position.

5. In a vehicle support, the combination with a crank shaped operating lever for pivotal connection with the frame of a vehicle, of supporting members for connection with the said operating lever, and sleeves swivelly mounted on the frame of the vehicle and adapted to slidably receive the said supporting members therethrough.

6. In a vehicle support, the combination with a crank shaped operating lever for pivotal connection with the frame of a vehicle, of supporting members for connection with the said operating lever, sleeves swivelly mounted on the frame of the vehicle and adapted to slidably receive the said supporting members therethrough, and means for securing the said operating lever in locked position relatively to the frame of the vehicle.

In testimony whereof I affix my signature in presence of two witnesses.

GROVER C. HILL.

Witnesses:
C. A. GLAHN,
E. A. McCORMICK.

Copies of this patent may be obtained for five cents each, by addressing the "Commissioner of Patents, Washington, D. C."